United States Patent [19]

Janssens

[11] 4,207,437
[45] Jun. 10, 1980

[54] PROCESSOR CONTROLLED TELECOMMUNICATION SWITCHING SYSTEM

[75] Inventor: Julian L. G. Janssens, Olmen, Belgium

[73] Assignee: International Standard Electric Corporation, New York, N.Y.

[21] Appl. No.: 508,416

[22] Filed: Sep. 23, 1974

Related U.S. Application Data

[63] Continuation of Ser. No. 338,834, Mar. 7, 1973, abandoned.

[51] Int. Cl.² .............................................. H04Q 3/54
[52] U.S. Cl. ................................................ 179/18 ES
[58] Field of Search .................................... 179/18 ES

[56] References Cited
U.S. PATENT DOCUMENTS 3,838,261   9/1974   Rice et al. ................... 179/18 ES X

OTHER PUBLICATIONS

"Metaconta Switching System," pp. 223–245, *Electrical Communication*, vol. 46, No. 4, 1971.

*Primary Examiner*—Thomas W. Brown
*Attorney, Agent, or Firm*—James B. Raden; Marvin M. Chaban

[57] ABSTRACT

Each memory individually associated with a respective one of two processors of a centrally controlled switching system incorporates status buffers. Information relating to each call is stored in a pair of status buffers in each memory, the status buffers of each pair being interlinked by linkage information. In case of a partial or a total breakdown of the system without the memory of at least one processor being affected, a special recovery program is executed by the latter processor to clear not only all the calls which are not in conversation, or not in a supervision phase, but also all the calls in a conversation phase for which pairs of associated status buffers contain erroneous linkage information.

6 Claims, 5 Drawing Figures

PROCESSOR CONTROLLED TELECOMMUNICATION SWITCHING SYSTEM

This is a continuation, of application Ser. No. 338,834 filed Mar. 7, 1973 abandoned.

BACKGROUND OF THE INVENTION

1. Field f the Invention

The present invention relates to a centrally controlled telecommunication switching system. It includes means adapted to establish and release call connections between inputs and outputs of a switching network under the control of at least two processors. Each processor in the system has access to a memory storing status words containing information about call connections established through said switching network and indicating the phase of these call connections, e.g. whether they are in the communication phase or not. Each processor, upon the occurrence of a breakdown of at least one other processor, executes a recovery program which consists in reading the information respecting phase stored in said status words and in releasing the corresponding call connections which are not in the communication phase.

2. Description of the Prior Art

Such a processor controlled telecommunication switching system is known from Belgian Pat. No. 709,719 (S. KOBUS et al 19-4-1-2-13) corresponding to U.S. Pat. No. 3,557,315, which issued on Mar. 10, 1970. Therein the mentioned recovery program is executed by a correctly operating processor upon one of the other processors becoming faulty and being put out of service. The status words read by the correctly operating processor are those storing information received from the faulty processor prior to becoming faulty and relating to call connections normally handled by this faulty processor.

The advantage provided by the execution of the above described program is that all the call connections which are in the communication phase are maintained. But a disadvantage is that some call connections are maintained even though the information thereof stored in the corresponding status words of the correctly operating processor might be faulty since they have been received from the processor which has now become faulty. This erroneous information may be the source of errors in the now correctly operating processor and lead to a breakdown of this processor.

SUMMARY OF THE INVENTION

It is therefore an object of the present invention to prevent the introduction of erroneous status words to a connecting operating processor.

The present processor controlled telecommunication switching system is particularly characterized in that the memory stores second status words containing information about said call connections, that a said second status word which contains information about a call connection of which information is also stored in a said first status word also contains linkage information interlinking these corresponding status words, and that said recovery program comprises the steps of addressing each of said first status words, executing said call phase reading operation and when finding said communication phase, addressing the second status word corresponding to said first status word, verifying whether said linkage information is correct or not, and releasing said call connection when this verification operation is not successful.

Thus, by verifying the linkage information, faults caused by errors which may have led to the breakdown are prevented from having a further erroneous effect on the operation of the above switching system.

Another object of the present invention is to provide a processor controlled telecommunication switching system of the above type which is also adapted to be executed e.g. in case of a total breakdown of the switching system.

The present processor controlled telecommunication switching system is also characterized in that it consists in feeding said recovery program into said memory from an outside source.

Still another characteristic of the present invention is that when each one of said processors has an associated memory said recovery program is fed into the memories of said processors consecutively until a processor is found which is adapted to execute said program, the execution of said program being definitively stopped when it cannot be executed by any one of said processors.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

DESCRIPTION OF PREFERRED EMBODIMENTS

Figure 1:
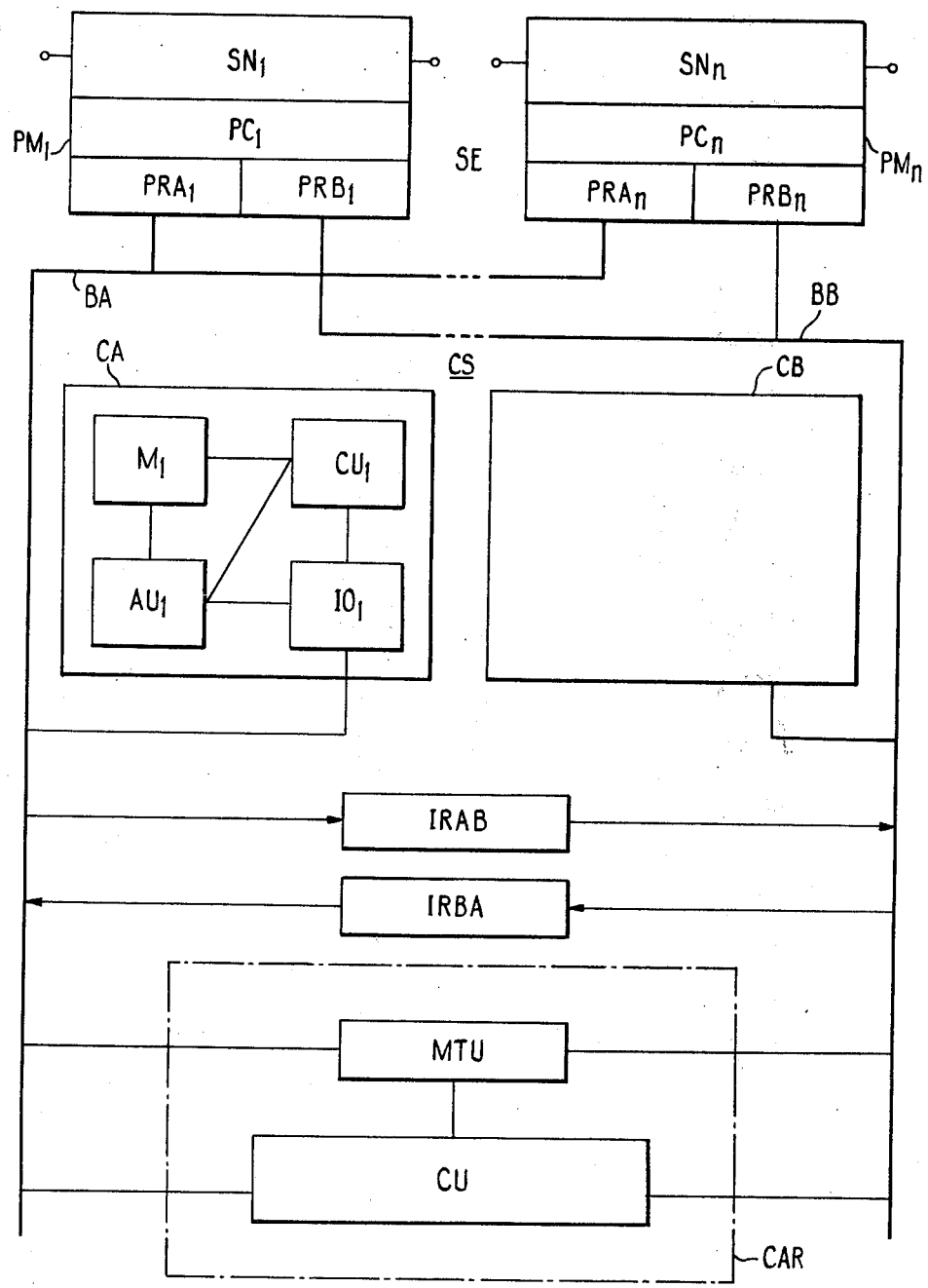
FIG. 1 is a schematic view of a processor controlled telecommunication switching system according to the present invention.

Principally referring to FIG. 1, the processor controlled telecommunication switching system shown therein includes switching equipment SE and a control system CS which includes two computers CA and CB interconnected by intercomputer communication registers IRAB and IRBA, and a control arrangement CAR.

The switching equipment SE is of the type disclosed in the above mentioned Belgian patent and is constituted by n peripheral modules such as PM1 and PMn which comprise each a switching network SN1, SNn coupled to pluralities of incoming and outgoing lines and trunks, peripheral circuitry PC1, PCn, and a pair of peripheral registers PRA1, PRB1; PRAn, PRBn. Each element of peripheral circuitry, such as PC1, PCn includes scanner units (not shown) to scan the switching network and marker-device units (not shown) to mark, establish and release paths in this switching network. The peripheral registers PRA1 to PRAn are connected to the computer CA via the busbar BA, while the peripheral registers PRB1 to PRBn are connected to the computer CA via the busbar BB.

The computers CA and CB are of a known construction as disclosed in U.S. Pat. No. 3,557,315, hereby incorporated by reference. Each of them includes a memory M1, M2, a control unit CU1, CU2, an arithmetic unit AU1, AU2, and input-output circuitry IO1, IO2, these devices being interconnected as shown. The input-output circuitries IO1 and IO2 are further connected to the busbars BA and BB respectively.

It should be noted that each computer may also be considered as a processor and a memory, the processor including the control unit, the arithmetic unit and the input-output circuitry.

The control arrangement CAR includes a control unit CU which is adapted to control a magnetic tape unit MTU, both CU and MTU being connected to the busbars BA and BB. The control unit CU is of the type disclosed in the Belgian Pat. No. 693 071 (R. SALADE et al 2-2-1, corresponding to Canadian Pat. No. 911,602, issued on Oct. 3, 1973, and corresponding to U.S. Pat. No. 3,562,716, issued on Feb. 9, 1971, and hereby incorporated by reference), and is adapted to control the execution of an extensive recovery program in case of a total breakdown of both the computers CA and CB. A short recovery program is stored in the MTU.

This control unit CU is also able to start the execution of this short recovery program upon the occurrence of a total breakdown and before controlling the execution of the above extensive recovery program, it having been found that a large number of total breakdowns is due to a temporary computer fault. The short recovery program can only be executed when the fault is temporary in at least one of the computers since it is executed by one of these computers, as will be described later.

As described in the above referenced Belgian patent, the computers CA and CB operate on a load-sharing basis i.e. they are adapted to simultaneously control the establishment of call communications through the switching equipment SE. They are also able to exchange information about the call communications via the intercomputer communication registers IRAB and IRBA. In each computer the call information is stored in so called status buffers forming part of their memory. Consequently, in each computer memory a plurality of status buffers stores information about calls being handled by the computer itself, while another plurality of status buffers stores information about calls handled by the other computer.

Figure 2:
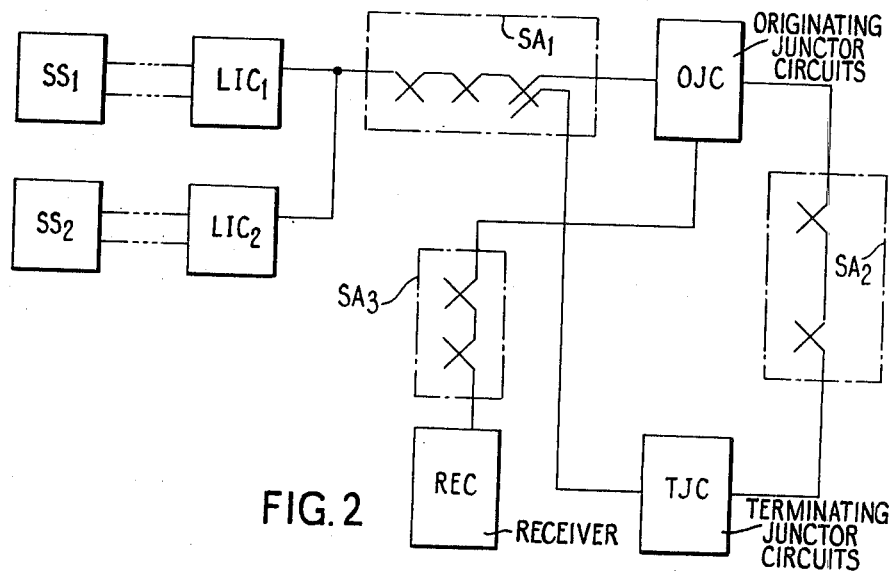
FIG. 2 represents part of the switching network SN1 of FIG. 1 in greater detail.

Before describing the above mentioned short recovery program executed upon the occurrence of a total (temporary) breakdown of both the computers CA and CB, the setting up of a local call will be described hereinafter to make clear what kind of information is stored in status buffers in this case. Reference is hereby made to FIG. 2 which shows in more detail part of the switching network SN1 represented in FIG. 1.

This switching network part includes a three-stage switching arrangement SA1 the inputs of which are connected to line circuits such as LIC1 and LIC2, which are in their turn coupled to subscriber stations such as SS1 and SS2. The outputs of the switching arrangement SA1 are connected to a plurality of originating junctor circuits such as OJC and to a plurality of terminating junctors such as TJC, these junctor circuits being interconnected by a two-stage switching arrangement SA2. The originating junctors are further connected to a plurality of receiver circuits shown as REC via a two-stage switching network SA3.

A local call between a calling subscriber station SS1 and a called subscriber station SS2 is established as follows.

After one of the computers e.g. CA has detected the calling subscriber station SS1 the line circuit LIC1 is connected to the originating junctor circuit OJC via the switching arrangement SA1 and this OJC is connected to a receiver circuit such as REC via the switching arrangement SA3. Dial tone is sent to the calling subscriber station SS1 from the receiver circuit REC and the number of the called subscriber station SS2 dialled in SS1 is detected in this receiver circuit REC. Thereafter the OJC is connected to a terminating junctor circuit such as TJC via the switching arrangement SA2 and this TJC is connected to the called subscriber station SS2 via the switching arrangement SA1. The above described phase of the call is the register phase. Ringing tone and ringing current are then sent to the calling and called subscriber stations respectively. This call phase is therefore called the ringing phase. The conversation or communication phase starts with the detection of the answer of the called subscriber station SS2 and ends when one of the stations SS1 or SS2 interrupts the connection. At this moment, the supervision phase starts and it ends when both the stations SS1 and SS2 have interrupted the connection.

As soon as an OJC has been seized, the register phase is inscribed in a corresponding first status word, hereinafter called originating junctor status buffer OJSB (FIG. 3) which is constituted by a 16-bit word of a table OJSBT forming part of the memory M1 of the computer CA. More particularly the register phase (RP) with code O1 is inscribed in the positions 13 and 14 of the OJSB the positions of which are numbered from 0 to 15. Normally the code 00 indicating that the OJSB is free (FR) is inscribed in these positions. During the ringing (RIP) and supervision (SP) phases the codes 10 and 11 are inscribed in the positions 13 and 14 of the OJSB, while during the conversation phase (CP) code bit 1 is inscribed in position 15 of the OJSB, a 0 being normally resistered in this position. In the position o of the OJSB a bit is stored which indicates that the information registered in the OJSB is handled by the processor CA or by the processor CB. This bit is the so called treated-by-me bit TBMB which is o when the OJSB is treated by CA and 1 when it is treated by CB. From this it becomes clear that when in the memory M1 information about calls treated by the processor CB is stored in originating junctor status buffers the bits TBMB thereof are in the 1-condition. From the above it also follows that in the memory M1 the bit TBMB in fact indicates the identity of the processor CA or of the processor CB.

As soon as the TJC has been seized the bit TBMB of a corresponding second status word, hereinafter called terminating junctor status buffer TJSB (FIG. 3) which is constituted by a 16-bit word of a table TJSBT forming part of the memory M1 of the computer CA is set to its 0-condition and the relative addresses OJSBA and TJSBA of the OJSB and the TJSB in the tables OJSBT and TJSBT are inscribed in the TJSB and the OJSB respectively. The OJSB and the TJSB are hence linked by the OJSBA since the OJSBA permits to find the OJSB as well as the TJSB. Indeed, by means of the OJSBA and OJSB is found and by the TJSBA stored therein the TJSB may be found. The TJSB and the OJSB are also interlinked by the TJSBA since the latter permits to find the TJSB and by the OJSBA stored therein the OJSB may be found. The TJSB further stores the type of call CT in its last bit.

When a total breakdown of both of processors CA and CB occurs this is registered in the control unit CU via the busbars BA, BB. The latter unit CU then operates the magnetic tape unit MTU to feed the short recovery program RPR into part RPMP of the memory of the computer which was the last to become faulty. It is supposed, for example, that this recovery program is fed into the memory M1 of the computer CA.

Figure 3:
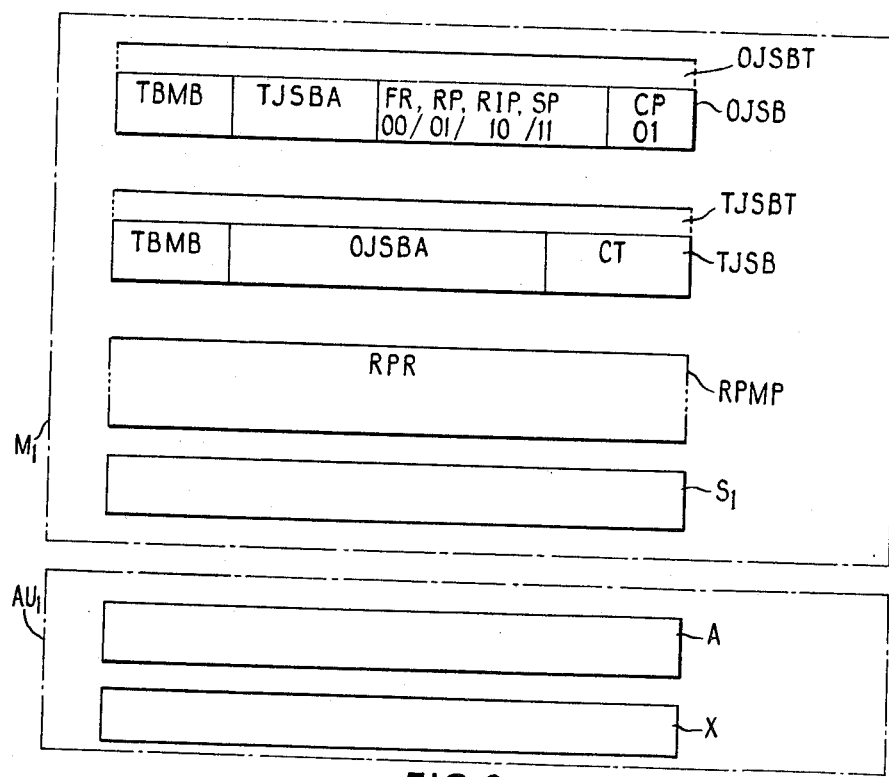
FIG. 3 shows part of the memory M1 and of the arithmetic unit AU1 of FIG. 1 in greater detail.
Figure 4:
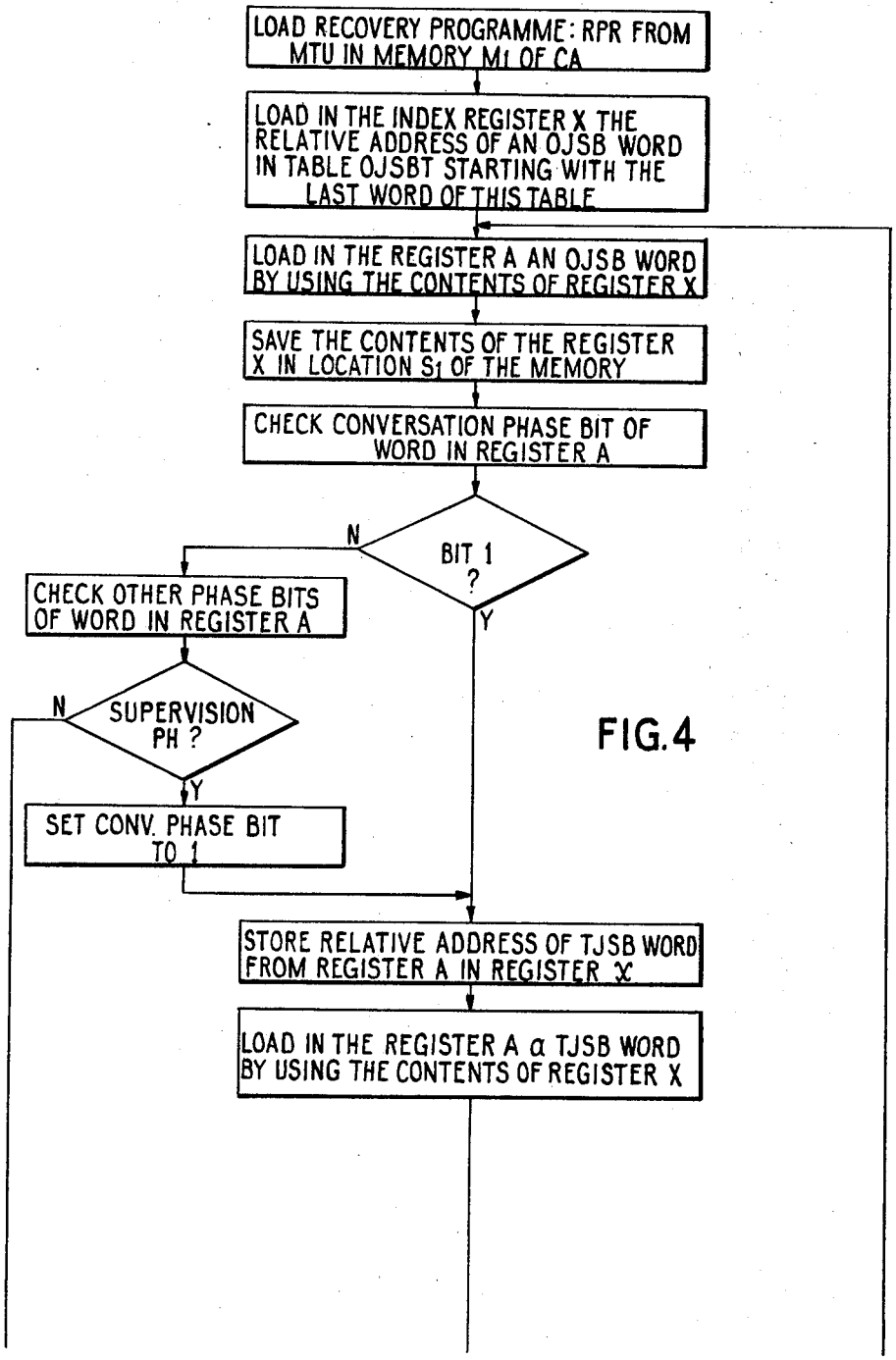
FIGS. 4 and 5 are flow charts FC1 and FC2 illustrating the operation of the system according to FIG. 1.
Figure 5:
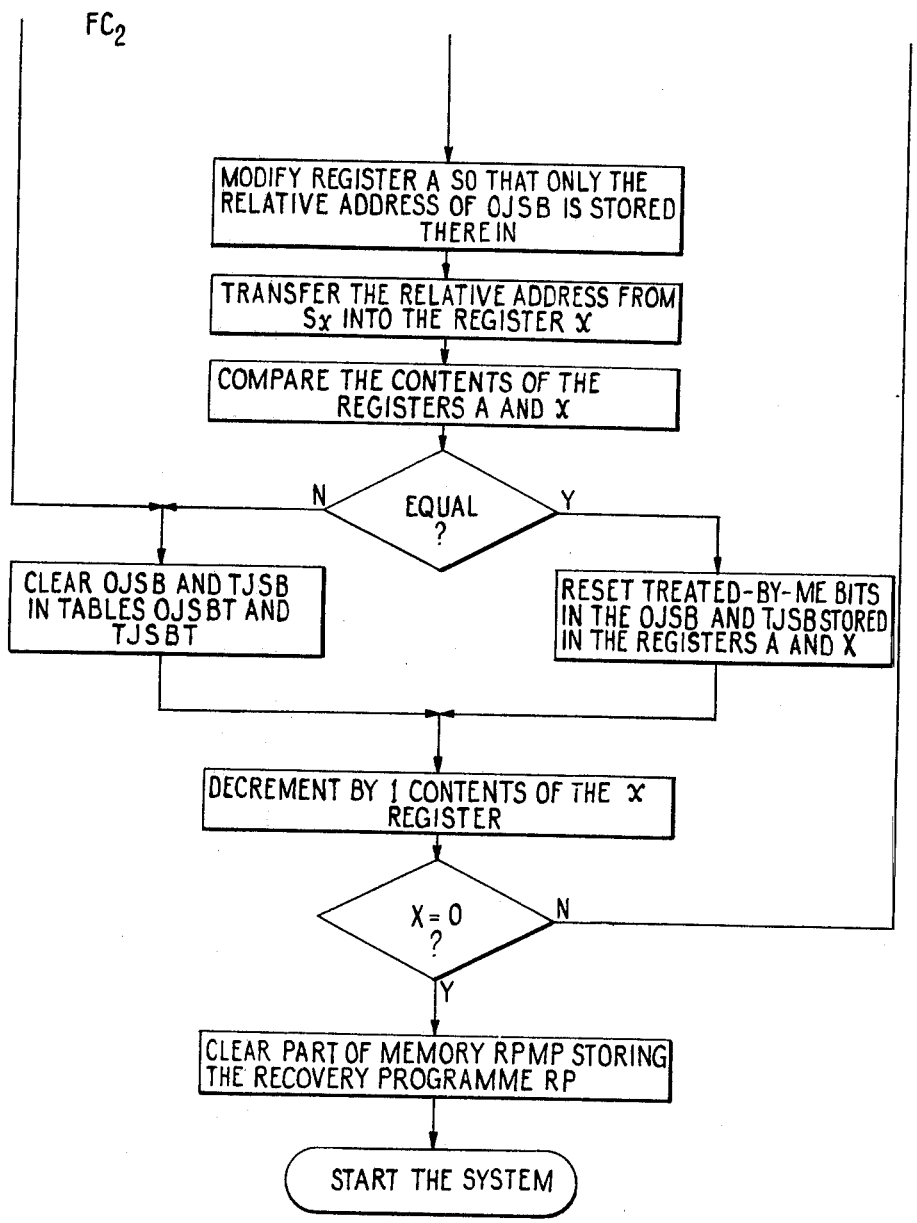

Principally referring to FIGS. 3 to 5, the execution of this recovery program under control of the computer CA is described in detail hereinafter.

The relative address of the last OJSB of the table OJSBT is loaded in the index register X forming part of the arithmetic unit AU1. By relative address is meant the address with respect to the address of the table i.e. the address of the first word of this table. By combining the address of the table OJSBT and the relative address stored in the register X an address is obtained by means of which the last OJSB word of this table is addressed and loaded in the accumulator register A which also forms part of the arithmetic unit AU. Afterwards the contents of the register X are saved in the memory part S1 of the memory M1 and the condition of the conversation phase bit CP which is the last bit of the word stored in the register A is checked.

When the conversation phase bit is not 1 the other phase bits, stored in the positions 13 and 14 of the register A, are read and it is checked whether the supervision phase indicating bits 11 are stored in these positions or not:

-in the negative the OJSB and the TJSB are cleared and the program is continued in a way which will be described later;

-in the positive the conversation phase bit is set to the 1-condition, whereafter the program is continued in the same way as described hereinafter for the case when the conversation bit is 1. This is done for the following reason: after one of the subscriber stations has interrupted the connection a time-out is started to give the subscriber the possibility during a short time interval to re-establish the connection. If now a breakdown occurs during this time-out this possibility is obviously made nil. By restoring the conversation phase one is sure that the supervision phase and hence the time-out will start from the beginning when the breakdown is finished.

When the conversation phase bit is 1 the terminating junctor status buffer relative address TJSBA forming part of the OJSB word stored in the register A is registered in the register X. By combining the address of the table TJSBT and the relative address stored in the register X an address is obtained by means of which a TJSB word of this table is addressed and loaded in the accumulator register A. The contents of the register A are then modified in such a manner that only the relative address OJSBA of an OJSB remains stored therein. Afterwards the relative address of the OJSB stored in the memory part S1 is transferred to the register X and the contents of the registers A and X are compared. More particularly it is checked if these contents are equal or not:

-in the negative the OJSB and the TJSB words are cleared;

-in the positive the treated-by-me bits TBMB in the OJSB and TJSB words in the tables OJSBT and TJSBT are reset to the O-condition to indicate that the information stored therein will be handled by computer CA after the breakdown is finished.

After these operations have been finished the contents of the register X are decremented by 1, and it is then checked whether these contents are not zero or zero. In the first case the relative address then stored in the register X is that of the following OJSB which is handled in the same manner as described above. In the second case the part RPMP of the memory M1 storing the recovery programme RP is cleared and the computer CA is brought on line.

After the computer CA has been brought on-line the originating and terminating junctor circuits are scanned by the peripheral circuitries PC1 to PCn under the control of the computer CA in an analogous way as described in the above mentioned Belgian patent 709 719 (S. KOBUS et al 19-4-1-2-13) corresponding to U.S. Pat. No. 3,557,315. Upon the detection of a difference between the real status of a OJC, TJC and the corresponding OJSB, TJSB, e.g. a busy OJC and a cleared OJSB, the corresponding OJC, TJC is released and the corresponding OJSB, TJSB is cleared when still necessary.

It should be noted that when the above recovery program RPR cannot be executed by the computer CA the control arrangement CA will be informed thereof and will then again operate the magnetic tape unit MTU to feed the recovery programme RPR to the computer CB. If also this computer is not able to execute this program the control arrangement will then start the execution of the above mentioned extensive recovery program.

Although the execution of the recovery program RP has been described in connection with a total breakdown of all the computers it can also be executed upon the occurrence of the breakdown of one of the computers. In this case instead of storing the recovery program RPR in an outside memory MTU, it may be stored in each of the computers. For instance it may form part of the take-over program already described in the above Belgian Pat. No. 709 719, U.S. Pat. No. 3,557,315).

Finally it should be noted that the present processing method is also applicable in a system where the computers have a single common memory.

While the principles of the invention have been described above in connection with specific apparatus, it is to be clearly understood that this description is made only by way of example and not as a limitation on the scope of the invention.

I claim:

1. A method of controlling a processor controlled telecommunication switching system comprising a switching network, in which said switching network is adapted to establish call connections between inputs and outputs of said switching network and to release these connections, and in which there are at least two processors coupled to said switching network to control said network, with each processor having access to a memory including an originating junctor status buffer storing first status words containing information about call connections established through said switching network and indicating the status of these call connections, e.g., whether they are in a supervision phase, ringing phase or communication phase, and in which each processor, upon the occurrence of a breakdown of at least one other processor executes a recovery program which includes the phase stored in said first status words and releasing corresponding call connections which are not in the communication phase, the improved method including the steps of storing in a terminating junctor status buffer second status words containing information about said call connections, whereby a second status word which contains information about a call connection of which information is also stored in a said first status word also contains linkage information interlinking these corresponding status words, said processor thereafter addressing each of said first status words, executing a call phase reading operation, and when finding said communication phase, addressing the second status word corresponding to each first status word to verify whether said linkage information is correct or not, and releasing said call connection when this verification operation is not successful.

2. A method of controlling a processor controlled telecommunications switching system according to claim 1, in which there is performed a verification operation which consists in comparing the address by means of which said first status word has been addressed and the first status word address stored in the second status word corresponding to said first status word.

3. A method of controlling a processor controlled telecommunications switching system according to claim 1, in which each of said first and second status words also contains information indicating the identity of the processor handling the call connection of which the information is stored in this status word, and that recovery program executed by said processor also comprises the step of replacing, if necessary, the identity stored in said first and second status words by its own identity when said verification operation has been successful.

4. A method of controlling a processor controlled telecommunications switching system according to claim 1, in which there is provided the step of feeding said recovery program into said memory from an outside source.

5. A method of controlling a processor controlled telecommunications switching system according to claim 4, in which each one of said processors has an associated memory, in which a recovery program is fed into the memories of said processors consecutively until a processor is found which is adapted to execute said program, and in which the execution of said program is stopped when it cannot be executed by any one of said processors.

6. A method of controlling a processor controlled telecommunications switching system according to claim 1, further including the step of storing a signal representing the supervision phase indicating that the corresponding call connection is going to be released when a first status word is found, and in which the information indicating the supervision phase in said first status word is replaced by said information indicating the communication phase prior to verifying said linkage information.

* * * * *